J. E. COLLINS.
CARPENTER'S SAW.
APPLICATION FILED APR. 12, 1919.
1,335,659.
Patented Mar. 30, 1920.
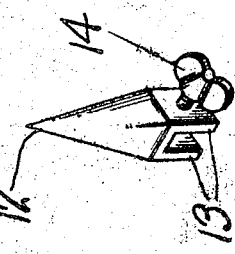
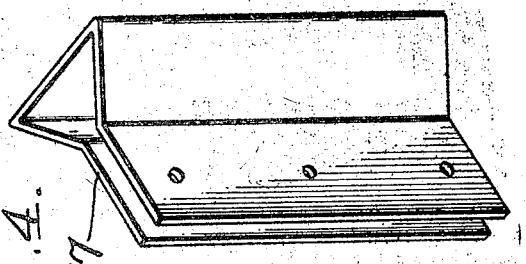
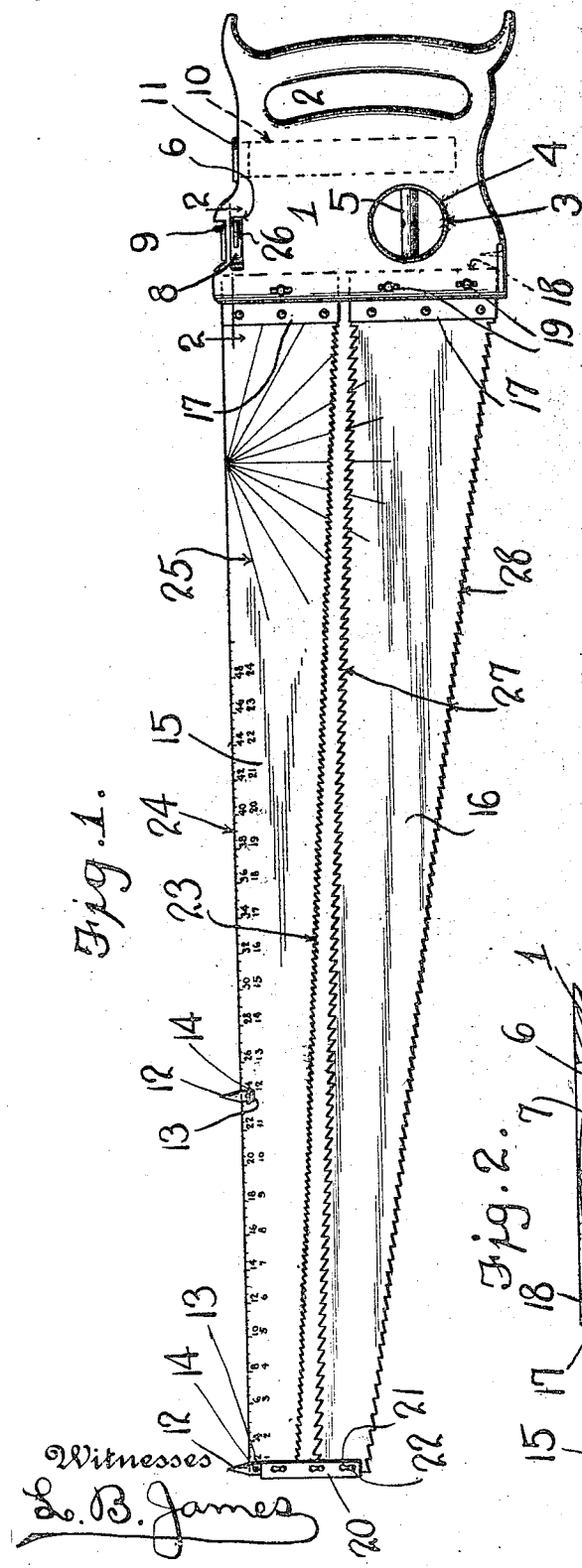
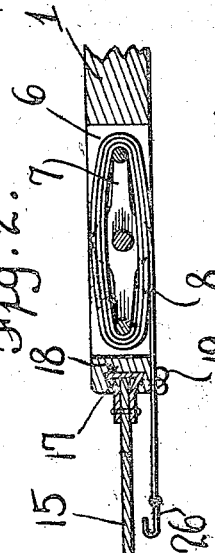
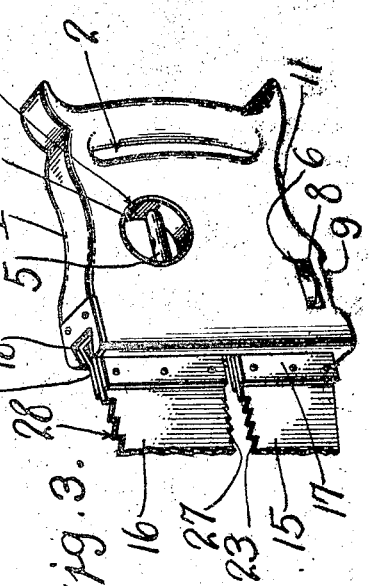
Inventor
Joseph E. Collins
By Victor J. Evans
Attorney
Witnesses
L. B. James

UNITED STATES PATENT OFFICE.

JOSEPH E. COLLINS, OF VANCOUVER, BRITISH COLUMBIA, CANADA.

CARPENTER'S SAW.

1,335,659.  Specification of Letters Patent.  Patented Mar. 30, 1920.

Application filed April 12, 1919. Serial No. 289,551.

*To all whom it may concern:*

Be it known that I, JOSEPH E. COLLINS, a subject to the King of Great Britain, residing at Vancouver in the Province of British Columbia, and Dominion of Canada, have invented new and useful Improvements in Carpenters' Saws, of which the following is a specification.

This invention relates to carpenters' saws and the principal object of the invention is to provide means whereby the saw may be used for a number of different purposes.

Another object of the invention is to provide a pair of blades for the saw with means for detachably securing them to the saw handle, said blades being provided with teeth of different sizes.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the saw;

Fig. 2 is a section on line 2—2 of Fig. 1;

Fig. 3 is an inverted perspective view of a portion of the saw;

Fig. 4 is a perspective view of one of the securing members for connecting the saw blade with the handle;

Fig. 5 is a perspective view of one of the detachable points.

In these views 1 indicates the handle which may be made of wood or any other suitable material. The handle is provided with the usual finger opening 2 and it is also provided with the circular opening 3 which is adapted to receive a ring 4 which carries a spirit level 5. The ring 4 is rotatably held in the opening so that the level may be used in for horizontal or vertical work. Adjacent the upper edge of the saw an opening 6 is formed which has a portion extending through said edge. This opening receives a reel 7 on which a tape measure 8 is wound. The handle 9 of said reel projects through the outer part of said opening so that the reel may be rotated. The handle also is provided with a pocket-forming recess 10 which extends into the handle from the upper edge thereof. This pocket is closed by a cap 11. The pocket is adapted to receive the points 12 which are provided with the forked ends 13 and these points are adapted to be clamped to the edge of the saw blade by the thumb screws 14 so that circles may be drawn by using one point as the center and moving the saw to cause the other point to mark the circle or portions of the circles. The saw is provided with two blades 15 and 16. Each blade is riveted to a wedge-shaped member 17 which is formed of a strip of metal bent, as shown in Fig. 4, with its parallel portions engaging the end of the saw blade. These wedge-shaped members are adapted to be slid into the dovetailed recess 18 formed in the edge of the handle and the members are held against movement in said recess by the thumb screws 19. One end of the recess is closed while the other end is open to receive the members. The small ends of the saw blades are removably secured together by the plate 20 having the keyhole slots 21 therein which engage the pins 22 carried by the ends of said blades. The blade 15 is provided with the small teeth 23 at one edge while its other edge is straight and is provided with the graduations 24 so that the said blade may be used as a straight edge and also as a rule. The blade is also provided with a series of lines 25 radiating from a common point, said point being located at the straight edge of the blade. Thus the blade may be used as a protractor in the usual manner. The tape 8 is provided with a hook 26 which may be placed in engagement with the small end of the blade so that the graduations on said tape will lie along the edge of the blade. The blade 16 is provided with the relatively coarse teeth 27 at one edge and with the fine teeth 28 at the other edge. Thus the saw may be used as a rip saw or as a cross cut saw while the fine teeth on the blade 15 may be used on fine work.

It will be seen that either blade may be easily and quickly removed so that any of the sets of teeth may be used. The outer edges of the wedge-shaped members 17 and also the edge of the saw handle are straight and are at right angles to the straight edge of the blade 15 so that the saw may be used as a square.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having described the invention what is claimed:—

A saw comprising a handle having a dovetailed slot in its front edge, a number of blades, a wedge-shaped member secured to the large end of each blade and adapted to engage said slot, means for removably holding said wedge-shaped members in said slot and a plate detachably connecting the small ends of the blades together.

In testimony whereof I affix my signature.

JOSEPH E. COLLINS.